United States Patent [19]

Inagaki

[11] Patent Number: 4,690,843
[45] Date of Patent: Sep. 1, 1987

[54] CASINGS FOR HAM AND SAUSAGE

[76] Inventor: Hiromichi Inagaki, 1-143, Aza Maedaomote, Inuyama-shi, Aichi-ken, Japan

[21] Appl. No.: 831,149

[22] Filed: Feb. 19, 1986

[51] Int. Cl.⁴ .......................... F16L 11/00; B32B 3/12
[52] U.S. Cl. ...................................... 428/36; 428/158; 428/913; 427/373; 426/105; 138/118.1
[58] Field of Search ................ 428/36, 158, 159, 913; 138/118.1; 426/105; 427/373

[56] References Cited

U.S. PATENT DOCUMENTS

| | | | |
|---|---|---|---|
| 2,882,163 | 4/1959 | Knaff | 138/118.1 |
| 3,931,429 | 1/1976 | Austin | 428/156 |
| 4,427,731 | 1/1984 | Gibson | 428/159 |
| 4,507,346 | 3/1985 | Maurer et al. | 428/158 |
| 4,547,433 | 10/1985 | Ohya et al. | 428/36 |
| 4,599,264 | 7/1986 | Kauffman et al. | 428/262 |

*Primary Examiner*—John E. Kittle
*Assistant Examiner*—James J. Seidleck
*Attorney, Agent, or Firm*—McGlew and Tuttle

[57] ABSTRACT

A casing for ham and sausage, has a cubic design and provides a buffer effect. Characters and other patterns are embossed on the casing surface. The characters and patterns are made using heat foamed ink, on one surface of a film to be pasted together with another film. The films each have a heat shrinkable property and together form the casing.

13 Claims, 5 Drawing Figures

CASINGS FOR HAM AND SAUSAGE

FIELD AND BACKGROUND OF THE INVENTION

This invention relates to casings used for ham and sausage, into which the meats are packed, and whose outer edges are bonded with clips. The meats in the casings are heat-stererized in heated water, and wrinkles in the casings disappear. A printed face on the casings raised three-dimensionally at the same time.

Animal intestines were used in the past for directly casing and sealing ham or sausage. Plastic films such as vinyliden chloride or heat shrinkage nylon have been used, however, in recent years. As the traditional sealing means in this type of casing, one edge of the casing formed into a cylindrical shape is bonded by a clip while the meat is packed from the other end and this edge is also bonded by a clip. The meat in the casing is then converted into a product through a smoking, heating or sterilizing process. As a remainder of the era when animal intestines, especially in the case of hams, where use, and a configuration of strings was engaged on the outside of the casing to bind it, it is popular to print casings with a string design around the external surface of the casing. In this type of printing, however, even if the expression of the pattern can surely be satisfied, it is difficult to attain the state where a string is actually bound, or the casing namely the state where the string is raised three-dimensionally, from the casing surface, and this it is in the current situation that this method still fails to express the actual physical feeling of the string. Therefore, an alternative method is available, as shown in FIG. 5, where heat foamed ink 02 is printed onto the surface of casing 01 so as to attain the cubic feeling by means of the foamed effect of this ink, but in this case, the foamed ink appears directly on the surface, and hence the printing effect not only is decreased by wear, discoloration or water absorption, but also can not be utilized, as it is, with ham and sausage that needs to be heat-sterilized, together with their casings, in heated water.

Also, in case of the animal intestines, the unique flexibility and elasticity being offered by this animal intestine act with each other in a favorable manner and the sealing becomes perfect when it is bonded by a clip but in case of the casing made of plastic film, the seal width in the vertical direction in forming it to a casing, gets thicker and there is such an event that the sealing becomes imperfect due to the appearance of unevenness in its flexibility.

SUMMARY OF THE INVENTION

The first objective of this invention is to obtain a casing in use for ham and sausage, in which actual physical substance is given by expressing a string pattern three-dimensionally, and that, the pattern is not subjected to any impairment by external friction, any change in color and any collapse in shape when it is heat-sterilized within heated water.

Furthermore, a second objective exists in providing a perfect sealing by means of clips, in the casing being used for ham and sausage.

This invention, as the means of achieving the aforesaid objectives, features string (net) printing or label printing using heat formed ink on a pasted-up surface of a base film, or an internal side of a plastic film that become pasted to the base film.

As the base film, such heat shrinkage substances as heat shrinkage nylon and vinylidene chloride are used.

Next, the film forming the casing surface is selected in consideration of high transparency, heat sealing performance and better printability, which is represented by polyethylene, as one example.

What's more, it is also possible to use the vinylidene chloride film for both the base film and the surface film.

As the bonding agent for pasting the base film up with the film on surface, the adhesives in the urethane system and other agents are selected in view of the characters of the films being pasted together.

As heat foamed ink, such kinds of inks are elected that display similar properties to print ink at ordinary temperature and swell from several times to tens of time when they are heated.

The heat foamed ink in this application of ink has the properties of usual inks and can offer some optional prints with use of various kinds of printing machines, and in case of a practical example, butane is contained inside a synthetic resin (thermoplastic resin mainly made of vinylidene chloride) micro-capsule of 10 to 30 micron grain size which is mixed and dispersed into a solution within a vehicle that is further selected from vinyl acetate, ethylene vinyl acetate, acrylic resin, urethane, polyester, nylon and the like, in view of the quality of material being printed or coated and the required physical properties. The foaming agent of the above structure is mixed in adequate volume within the printing ink, paint and coating agent, becoming the heat foamed type ink, paint and coating agent and employing the substance where the micro capsule within the ink and coating agent swells 4 to 5 times in diameter and 70 to 100 times in volume when heated at temperature levels higher than 120° C.

DESCRIPTION OF THE PREFERRED EMBODIMENTS

Figure 1:
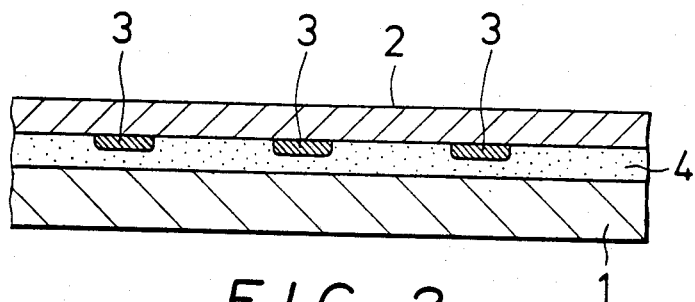
FIG. 1 is a sectional view, before heating, of a part of the casing relating to this invention.

The basic practical example of this invention is given in FIG. 1.

In this figure, the number 1 stands for a base film consisting of heat shrinkage nylon while the 2 is the thermoplastic surface film who's rear face (the face to be pasted up) is provided with printing using heat foamed or foamable ink 3, that is made of polyethylene and pasted up to the aforesaid base film 1 by a bonding agent 4 of the urethane system. For information, it is precondition that the surface film 2 should be the film of nature indicating the plasticity at the foaming temperature of said heat foamed ink 3. In the production method of the aforesaid packing body, the printing with use of heat foamed ink is freely applicable to gravure print, flexible print, silk screen print, off-set print, and so forth.

Figure 2:
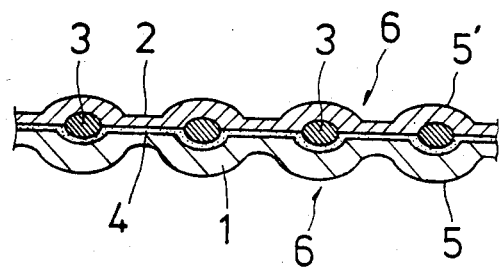
FIG. 2 is a sectional view of the casing in a shrunken state where the printing ink is heat-foamed.
Figure 3:
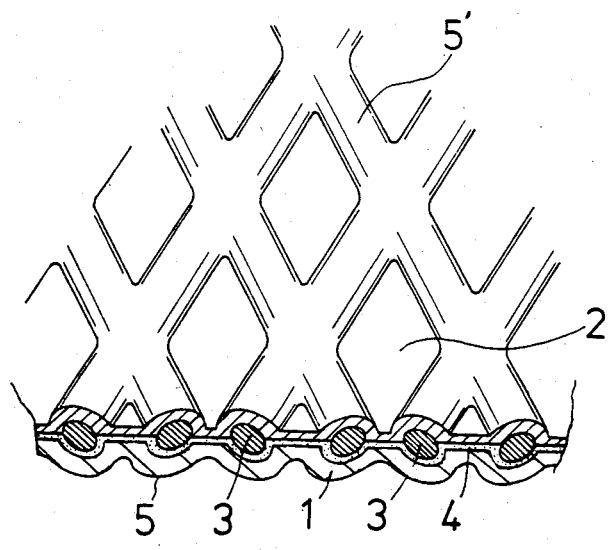
FIG. 3 is a perspective view of FIG. 2.
Figure 4:
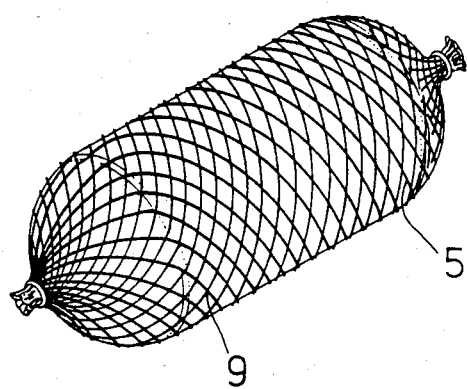
FIG. 4 is a perspective view of a ham that has been packed in the casing according to this invention.
Figure 5:
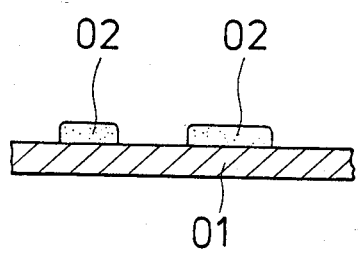
FIG. 5 is a sectional view showing the conventional heat foamed ink after it has been foamed.

FIG. 2 indicates that the state of foaming the heat foamable ink 3 and at the same time of heat-shrinking for both the base film 1 and the surface film 2. The heat foamed ink 3 builds up the irregular face 6 on both sides as shown in FIG. 2 and FIG. 3 by using the heat shrinkage film on both the surfaces and by heating up and heat-forming them. The irregular face 6 is utilized, as shown in FIG. 4, as the string (net) pattern 9 of ham casing 5, or used as a label for raising the appearance of the casing when other types of printing is performed thereon.

It is optional whether to select thermoplastic or heat shrinkage film for the base film 1. This can be decided in view of the applications for the packing body.

Since this invention serves to heat foam the heat foamable ink 3 that is intervened between the heat shrinkage based film 1 and the thermoplastic surface film 2 as mentioned above, it is expected to provide effects as follows:

a. Because the film being softened by the foaming temperature of heat-foamed ink is built up on the surface side of the heat-foamed ink and the heat-foamed ink is surface coated on this surface film, the heat-foamed ink is protected from wear out and discoloration.

b. The heat-foamed ink face has a lustrous and nice-looking appearance.

c. By employing the heat shrinkage film on both the base film and the surface film, the swelling effect of heat-foamed ink can be emphasized and the three-dimensional effect and the buffer effect can be extended.

d. If the heat-foamed ink is printed on the clipped area and this area is clipped when the casing is used for ham and sausage, the clamping force in this clipped area is increased by the heat-foaming action with subsequent rise in sealing effect, eliminating the problems of pin holes.

I claim:

1. A casing for use in enclosing ham and sausage, comprising a heat shrinkable base film having an inner surface and an outer surface, a surface film having an inner surface adhered to said outer surface of said base film, a pattern of heat foamable ink forming an inner pattern between said outer surface of said base film and said inner surface of said surface films, said inner pattern being provided on one of said inner surfaces of said surface film and said outer surface of said base film whereby heating of said casing causes shrinkage of said shrinkable base film and expansion of said heat foamable ink to form a textured pattern on said outer surfaces corresponding to said pattern of foamable ink.

2. A casing according to claim 1, wherein said base film and said surface film are both made of heat shrinkable material.

3. A casing according to claim 1, including a bonding material between said inner surfaces of said base and surface film for adhering said base and surface films together.

4. A casing according to claim 3, wherein said bonding agent is made of a material from the urethane system.

5. A casing according to claim 1, wherein said pattern comprises a plurality of elongated strands of heat foamable ink crossing each other to form a net pattern.

6. A casing according to claim 5, wherein said base film and said surface film are both made of heat shrinkable material.

7. A method of forming a casing for ham and sausage comprising printing a pattern using heat foamable ink onto an inner surface of surface film, applying a bonding agent onto the inner surface of the surface film over the heat foamable ink, attaching a heat shrinkable base film over the bonding agent to adhere the base film to the surface film and heating the base film, surface film and heat foamable ink to shrink the base film and to expand the heat foamable ink to form a three dimensional pattern on outer surfaces of the base and surface film.

8. A method according to 7, including forming the pattern using crossing straight lines to form a string net pattern.

9. A method according to claim 8, including forming the base film and the surface film out of heat shrinkable material.

10. A casing for use in enclosing ham, and sausage, comprising: a heat shrinkable base having an inner surface and outer surface; a bonding material adjacent said outer surface of said heat shrinkable base film; a heat shrinkable surface film having an inner surface adhere to said outer surface of said base film by said bonding material; a pattern of heat foamable ink forming an inner pattern between said outer surface of said base film and said inner surface of said surface film, said inner pattern being provided on one of said inner surface of said surface film and said outer surface of said base film whereby heating of said casing causes shrinkage of said shrinkable base film and shrinkage of said shrinkable surface film and expansion of said heat foamable ink to form a textured pattern on said outer surface corresponding to said pattern of said foamable ink.

11. A casing according to claim 10, wherein: said bonding agent is made of material of material from the urethane system.

12. A casing according to claim 10, wherein: said pattern comprises a plurality of elongated strands of heat foamable ink crossing each other to form a net pattern.

13. A casing according to claim 10, wherein the casing having said base film, said bonding material, said surface film and said pattern of heat foamable ink in apposed between said base film and said surface film is adapted for being clipped thereby providing a clamping force in a clipped area said clamping force being increased by the heat-foaming action with subsequent rise in sealing effect.

* * * * *